US011555704B2

(12) United States Patent
Servos et al.

(10) Patent No.: US 11,555,704 B2
(45) Date of Patent: Jan. 17, 2023

(54) SYSTEMS AND METHODS FOR UPDATING AN ELECTRONIC MAP

(71) Applicant: Clearpath Robotics Inc., Kitchener (CA)

(72) Inventors: James Dustin Servos, Kitchener (CA); Ryan Christopher Gariepy, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 226 days.

(21) Appl. No.: 16/185,077

(22) Filed: Nov. 9, 2018

(65) Prior Publication Data

US 2019/0186923 A1 Jun. 20, 2019

Related U.S. Application Data

(60) Provisional application No. 62/584,238, filed on Nov. 10, 2017.

(51) Int. Cl.
| | |
|---|---|
| *G01C 21/20* | (2006.01) |
| *G05D 1/02* | (2020.01) |
| *G01C 21/00* | (2006.01) |
| *G06V 20/56* | (2022.01) |
| *G01C 21/32* | (2006.01) |

(52) U.S. Cl.
CPC .......... *G01C 21/206* (2013.01); *G01C 21/32* (2013.01); *G01C 21/3837* (2020.08); *G05D 1/0246* (2013.01); *G06V 20/56* (2022.01); *G05D 1/0274* (2013.01)

(58) Field of Classification Search
CPC combination set(s) only.
See application file for complete search history.

(56) References Cited

U.S. PATENT DOCUMENTS

| | | | |
|---|---|---|---|
| 7,693,757 B2 | 4/2010 | Zimmerman | |
| 8,634,981 B1 | 1/2014 | Hyde et al. | |
| 2005/0216126 A1 | 9/2005 | Koselka et al. | |
| 2010/0049391 A1 | 2/2010 | Nakano | |

(Continued)

FOREIGN PATENT DOCUMENTS

CA 2762743 A1 6/2012

*Primary Examiner* — Anne Marie Antonucci
*Assistant Examiner* — Amelia Vorce
(74) *Attorney, Agent, or Firm* — Bereskin & Parr LLP/S.E.C.R.L., s.r.l.

(57) ABSTRACT

Systems and methods for updating an electronic map of a facility are disclosed. The electronic map includes a set of map nodes. Each map node has a stored image data associated with a position within the facility. The method includes collecting image data at a current position of a self-driving material-transport vehicle; searching the electronic map for at least one of a map node associated with the current position and one or more neighboring map nodes within a neighbor threshold to the current position; comparing the collected image data with the stored image data of the at least one of the map node and the one or more neighboring map nodes to determine a dissimilarity level. The electronic map may be updated based at least on the collected image data and the dissimilarity level. The image data represents one or more features observable from the current position.

19 Claims, 15 Drawing Sheets

(56) References Cited

U.S. PATENT DOCUMENTS

| | | | |
|---|---|---|---|
| 2010/0321489 A1* | 12/2010 | Chen | G01S 5/16 |
| | | | 348/116 |
| 2012/0121161 A1 | 5/2012 | Eade et al. | |
| 2012/0173018 A1 | 7/2012 | Allen et al. | |
| 2012/0197464 A1 | 8/2012 | Wang et al. | |
| 2014/0002439 A1* | 1/2014 | Lynch | G06T 11/00 |
| | | | 345/419 |
| 2014/0309833 A1 | 10/2014 | Ferguson et al. | |
| 2015/0088310 A1 | 3/2015 | Pinter et al. | |
| 2016/0005229 A1* | 1/2016 | Lee | G06F 3/0488 |
| | | | 345/419 |
| 2017/0116477 A1* | 4/2017 | Chen | G06K 9/00651 |
| 2017/0122749 A1 | 5/2017 | Urano et al. | |
| 2017/0168488 A1 | 6/2017 | Wierzynski et al. | |
| 2018/0058861 A1* | 3/2018 | Doria | G01S 7/4808 |
| 2018/0188045 A1* | 7/2018 | Wheeler | H04L 69/40 |
| 2018/0336421 A1* | 11/2018 | Huang | G05D 1/0274 |
| 2019/0129431 A1* | 5/2019 | Yalla | G05D 1/0212 |
| 2019/0146500 A1* | 5/2019 | Yalla | G01C 21/3407 |
| | | | 701/25 |
| 2019/0179307 A1* | 6/2019 | Anderson | G05D 1/0061 |
| 2020/0051443 A1* | 2/2020 | Zhao | G08G 5/0039 |
| 2020/0089232 A1* | 3/2020 | Gdalyahu | G01C 21/3602 |
| 2020/0104289 A1* | 4/2020 | Premawardena | G06F 16/2322 |

\* cited by examiner

SYSTEMS AND METHODS FOR UPDATING AN ELECTRONIC MAP

CROSS-REFERENCE TO RELATED APPLICATIONS

This application claims priority to U.S. Provisional patent Application No. 62/584,238, filed 10 Nov. 2017, and titled "SYSTEMS AND METHODS FOR UPDATING AN ELECTRONIC MAP", the contents of which are incorporated herein by reference for all purposes.

TECHNICAL FIELD

The described embodiments relate to simultaneous localization and mapping, and in particular, to systems and methods for updating an electronic map.

BACKGROUND

The following paragraphs are not an admission that anything discussed in them is prior art or part of the knowledge of persons skilled in the art.

An automated guided vehicle ("AGV") operates along pre-determined paths, defined by specific infrastructure, such as a magnetic strip. AGVs cannot deviate from the pre-determined path. In contrast, a self-driving material-transport vehicle can operate without specific infrastructure and are not limited to a pre-determined path. A self-driving material-transport vehicle can sense its environment and navigate its environment without human input.

A self-driving material-transport vehicle typically stores an electronic map of its environment and identifies its location within the environment based the stored electronic map and what it has sensed in its environment. However, the electronic map can become out of date as the environment changes.

SUMMARY

The various embodiments described herein generally relate to methods (and associated systems configured to implement the methods) for updating an electronic map of a facility. The method includes collecting image data at a current position of a self-driving material-transport vehicle; searching the electronic map for at least one of (i) a map node associated with the current position and (ii) one or more neighboring map nodes within a neighbor threshold to the current position, comparing the collected image data with the stored image data of the at least one of the map node and the one or more neighboring map nodes to determine a dissimilarity level; and in response to determining the dissimilarity level exceeds a dissimilarity threshold, updating the electronic map based at least on the collected image data. The image data represents one or more features observable from the current position. The electronic map includes a set of map nodes and each map node includes a stored image data associated with a position within the facility.

In some aspects, comparing the collected image data with the stored image data to determine the dissimilarity level includes comparing the collected image data with the stored image data of the map node to determine the dissimilarity level.

In some aspects, searching the electronic map includes, in response to determining the electronic map does not include the map node associated with the current position, searching the electronic map for the one or more neighboring map nodes within the neighbor threshold to the current position.

In some aspects, comparing the collected image data with the stored image data includes comparing the collected image data with the stored image data of the one or more neighboring map nodes to determine the dissimilarity level.

In some aspects, comparing the collected image data with the stored image data includes: determining a number of mismatched points between the collected image data and the stored image data; and determining the dissimilarity level based on the number of mismatched points and a total number of points.

The mismatched points may include one or more points associated with one of a projection error and a reprojection error between the collected image data and the stored image data.

The reprojection error may include a mismatch between the collected image data and the stored image data exceeding an offset threshold.

The electronic map may include the map node associated with the current position. In some aspects, updating the electronic map based at least on the collected image data includes replacing the stored image data of the map node with the collected image data.

In some aspects, updating the electronic map based at least on the collected image data includes in response to determining the electronic map does not include the map node associated with the current position, adding a new map node to the electronic map for the current position and storing at the new map node the collected image data.

In some aspects, adding the new map node includes connecting the new map node to at least two other map nodes of the electronic map.

In some aspects, the method further includes determining that the electronic map includes one or more excessive neighboring map nodes relative to the new map node, and in response to determining the electronic map includes the one or more excessive neighboring map nodes, removing the one or more excessive neighboring map nodes from the electronic map. The one or more excessive neighboring map nodes can be a map node associated with a position that is less than an excessive neighbor distance from the current position of the new map node.

The excessive neighbor distance may include a minimum distance between two map nodes of the electronic map.

In some aspects, updating the electronic map based at least on the collected image data includes, for each neighboring map node of the one or more neighboring map nodes, comparing the collected image data with the stored image data to determine the dissimilarity level; and in response to determining the dissimilarity level exceeds a node removal threshold, removing that neighboring map node from the electronic map.

The node removal threshold may be greater than the dissimilarity threshold.

The neighbor threshold may include a maximum distance between a position of two map nodes. The neighbor threshold may include a maximum number of map nodes.

The dissimilarity threshold may include a minimum mismatch between the collected image data and the stored image data to indicate the electronic map is outdated.

In some aspects, the method further includes determining the dissimilarity threshold based on at least one of a facility type of the facility and one or more prior updates to the electronic map.

In some aspects, collecting the image data at the current position of the self-driving material-transport vehicle includes operating the self-driving material-transport vehicle to collect the image data while the self-driving material-transport vehicle is conducting a mission.

The position of each map node can include a coordinate and a heading within a coordinate system assigned to the electronic map.

In another aspect, a system for updating an electronic map of a facility is described. The electronic map includes a set of map nodes and each map node includes a stored image data associated with a position within the facility. The system includes one or more self-driving material-transport vehicles operable to navigate the facility.

The self-driving material-transport vehicle of the one or more self-driving material-transport vehicles may include: a memory to store the electronic map, one or more sensors to collect image data at a current position of the at least one self-driving material-transport vehicle, and a processor. The processor is operable to: search the electronic map for at least one of (i) a map node associated with the current position and (ii) one or more neighboring map nodes within a neighbor threshold to the current position, compare the collected image data with the stored image data of the at least one of the map node and the one or more neighboring map nodes to determine a dissimilarity level; and in response to determining the dissimilarity level exceeds a dissimilarity threshold stored in the memory, update the electronic map based at least on the collected image data. The image data represents one or more features observable form the current position. The neighbor threshold can be stored in memory.

BRIEF DESCRIPTION OF THE DRAWINGS

Several embodiments will now be described in detail with reference to the drawings, in which:

FIG. 118 is an illustration of removing an excessive neighboring map node from an electronic map, according to at least one embodiment.

Figure 1:
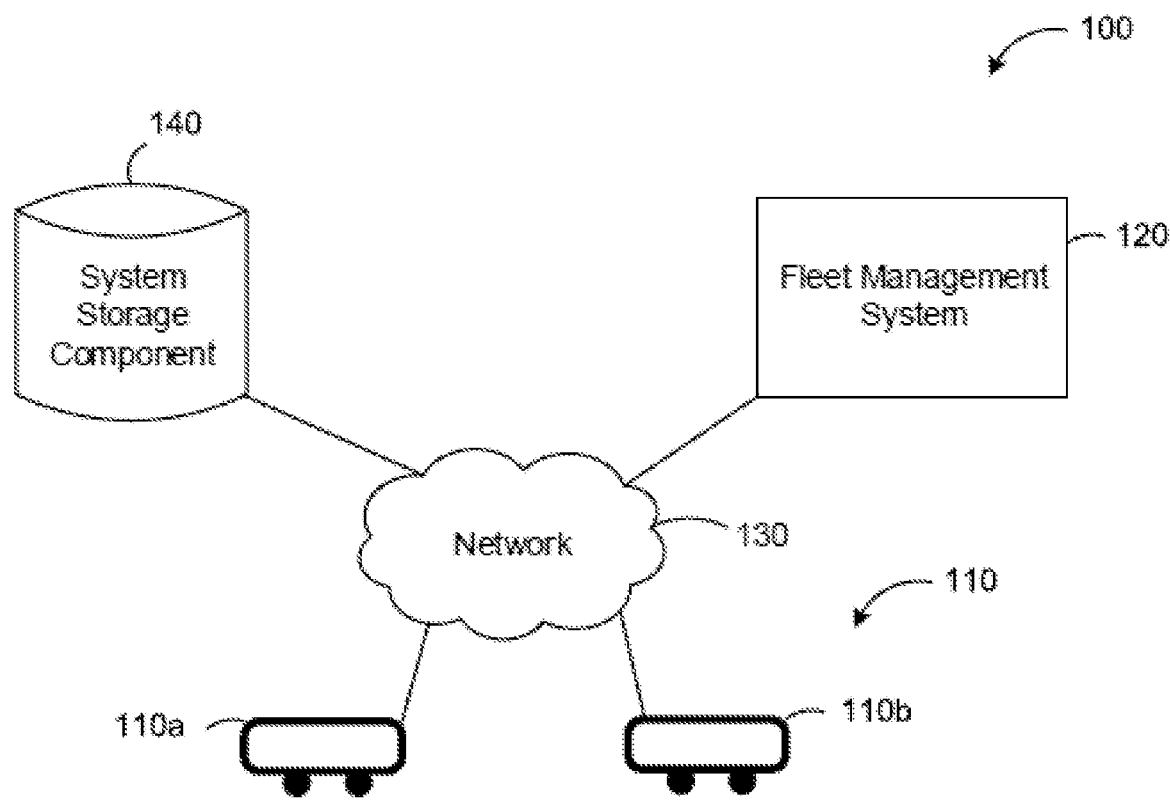
FIG. 1 is a diagram of a system of one or more self-driving material-transport vehicles, according to at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Self-driving material-transport vehicles identify their location within the environment based on a stored electronic map of its environment and what it has sensed in its environment. The process of localization involves taking a scan of the environment and then comparing known features of the environment found in the scan with known features of the environment in the electronic map in order to identify the position of the self-driving material-transport vehicle. However, features found in the scan can be different from known features in the electronic map if the environment has changed. The environment may change when objects are moved.

Since self-driving material-transport vehicles are driving around the facility to execute missions, they can simultaneously observe the environment and update the electronic map based on their observations. Self-driving material-transport vehicles can be operated to update the electronic map during missions or between missions. As a result, the electronic map can be continuously updated.

However, the electronic map can grow in size with continuous updates, eventually becoming unmanageable. In order to maintain a proper map, it is desirable to represent features of the environment in an electronic map efficiently.

Referring to FIG. 1, there is shown a system 100 of one or more self-driving material-transport vehicles 110, according to at least one embodiment. The system 100 can include one or more self-driving material-transport vehicles 110, a fleet management system 120, a network 130, and a system storage component 140. While FIG. 1 shows the system 100 having two self-driving material-transport vehicles 110a and 110b for illustrative purposes. The system 100 can include one or more self-driving material-transport vehicles 110.

According to some embodiments, a fleet management system 120 may be used to provide a mission to a self-driving material-transport vehicle 110. The fleet management system 120 has a processor, memory, and a communication interface (not shown) for communicating with the network 130. The fleet management system 120 uses the memory to store computer programs that are executable by the processor (e.g. using the memory) so that the fleet management system 120 can communicate information with other systems, and communicate with one or more self-driving material-transport vehicles 110. In some embodiments, the fleet management system 120 can also generate missions for the self-driving material-transport vehicles 110.

Any or all of the self-driving material-transport vehicles 110 and the fleet management system 120 may communicate with the network 130 using known telecommunications protocols and methods. For example, each self-driving material-transport vehicle 110 and the fleet management system 120 may be equipped with a wireless communication interface to enable wireless communications according to a WiFi protocol (e.g. IEEE 802.11 protocol or similar).

According to some embodiments, the system storage component 140 can store information about the self-driving material-transport vehicles 110 as well as electronic maps of the facilities within which the self-driving material-transport vehicles 110 operate. Electronic maps can be stored in the system storage component for subsequent retrieval by individual self-driving material-transport vehicles 110. Individual self-driving material-transport vehicles 110 can download electronic maps from the system storage component 140 via network 130.

Electronic maps can be human generated. For example, a CAD file can be imported and form the basis for an electronic map. In another example, an electronic map can be built by driving the self-driving material-transport vehicle 110 around the facility for the purpose of building an electronic map.

Figure 2:
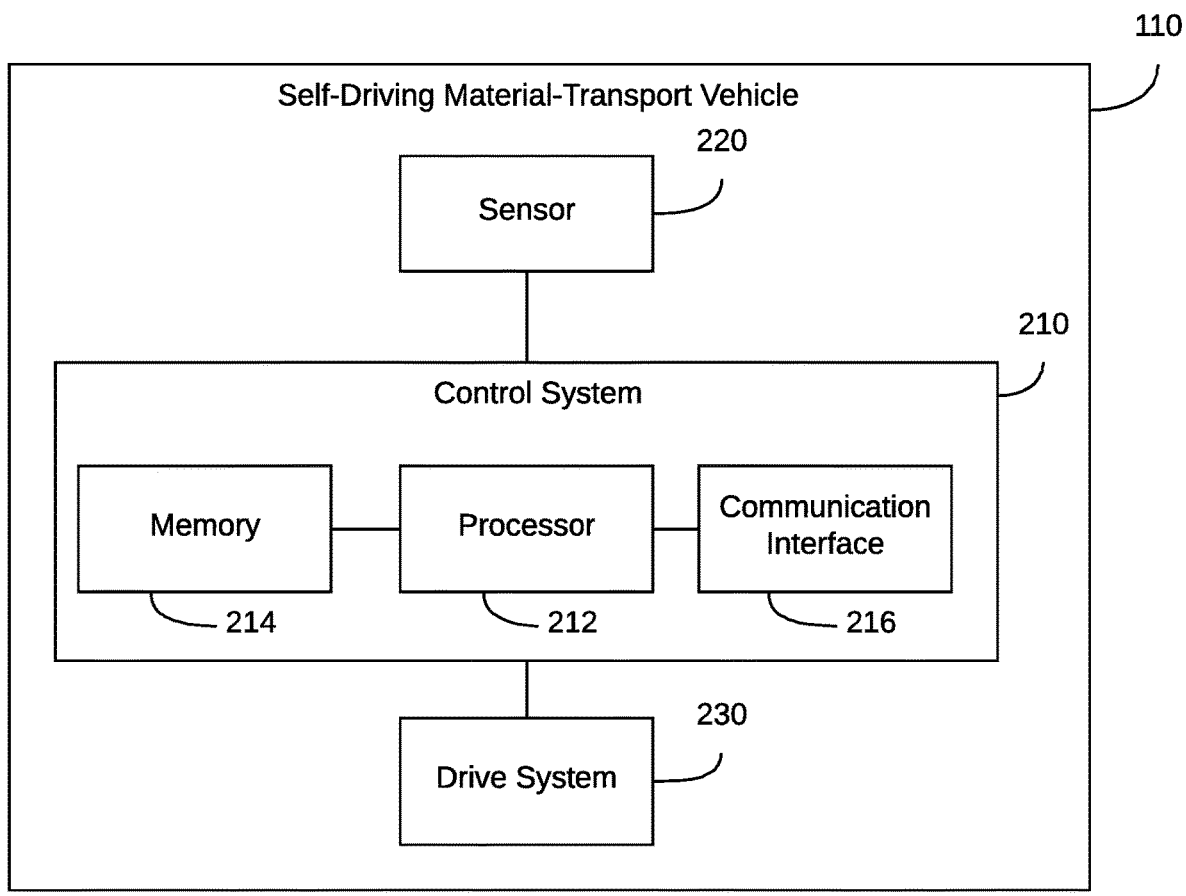
FIG. 2 is a block diagram of a self-driving material-transport vehicle, according to at least one embodiment.

Referring to FIG. 2, there is shown a block diagram of a self-driving material-transport vehicle 110, according to at least one embodiment. The self-driving material-transport vehicle 110 generally includes a control system 210 and a drive system 230.

The control system 210 can include a processor 212, memory 214, communication interface 216, and one or more sensors 220. The control system 210 enables the self-driving material-transport vehicle 110 to operate automatically and/or autonomously. The control system 210 can store an electronic map that represents the environment of the self-driving material-transport vehicle 110, such as a facility, in the memory 214.

According to some embodiments, the communication interface 216 can be a wireless transceiver for communicating with a wireless communications network (e.g. using an IEEE 802.11 protocol or similar).

One or more sensors 220 may be included in the self-driving material-transport vehicle 110 to obtain data about the environment of the self-driving material-transport vehicle 110. For example, according to some embodiments, the sensor 220 may be a LiDAR device (or other optical/laser, sonar, radar range-finding such as time-of-flight sensors). The sensor 220 may be optical sensors, such as video cameras and systems (e.g., stereo vision).

According to some embodiments, the self-driving material-transport vehicle 110 may receive a mission from a fleet management system 120 or other external computer system in communication with the self-driving material-transport vehicle 110 (e.g. in communication via the communication interface 216). In this case, the mission contains one or more waypoints or destination locations. Based on the waypoint or destination location contained in the mission, the self-driving material-transport vehicle 110, based on the control system 210, can autonomously navigate to the waypoint or destination location without receiving any other instructions from an external system. For example, the control system 210, along with the sensors 220, enable the self-driving material-transport vehicle 110 to navigate without any additional navigational aids such as navigational targets, magnetic strips, or paint/tape traces installed in the environment in order to guide the self-driving material-transport vehicle 110.

For example, the control system 210 may plan a path for the self-driving material-transport vehicle 110 based on a destination location and the location of the self-driving material-transport vehicle 110. Based on the planned path, the control system 210 may control the drive system 230 to direct the self-driving material-transport vehicle 110 along the planned path. As the self-driving material-transport vehicle 110 is driven along the planned path, the sensors 220 may update the control system 210 with new images of the environment of the self-driving material-transport vehicle 100, thereby tracking the progress of the self-driving material-transport vehicle 110 along the planned path and updating the location of the self-driving material-transport vehicle 110.

Since the control system 210 receives updated images of the environment of the self-driving material-transport vehicle 110, and since the control system 210 is able to autonomously plan the self-driving material-transport vehicle's path and control the drive system 230, the control system 210 is able to determine when there is an obstacle in the self-driving material-transport vehicle's path, plan a new path around the obstacle, and then drive the self-driving material-transport vehicle 110 around the obstacle according to the new path.

The positions of the components 210, 212, 214, 216, 220, and 230 of the self-driving material-transport vehicle 110 are shown for illustrative purposes and are not limited to the positions shown. Other configurations of the components 2/10, 212, 214, 216, 220, and 230 are possible.

Figure 3:
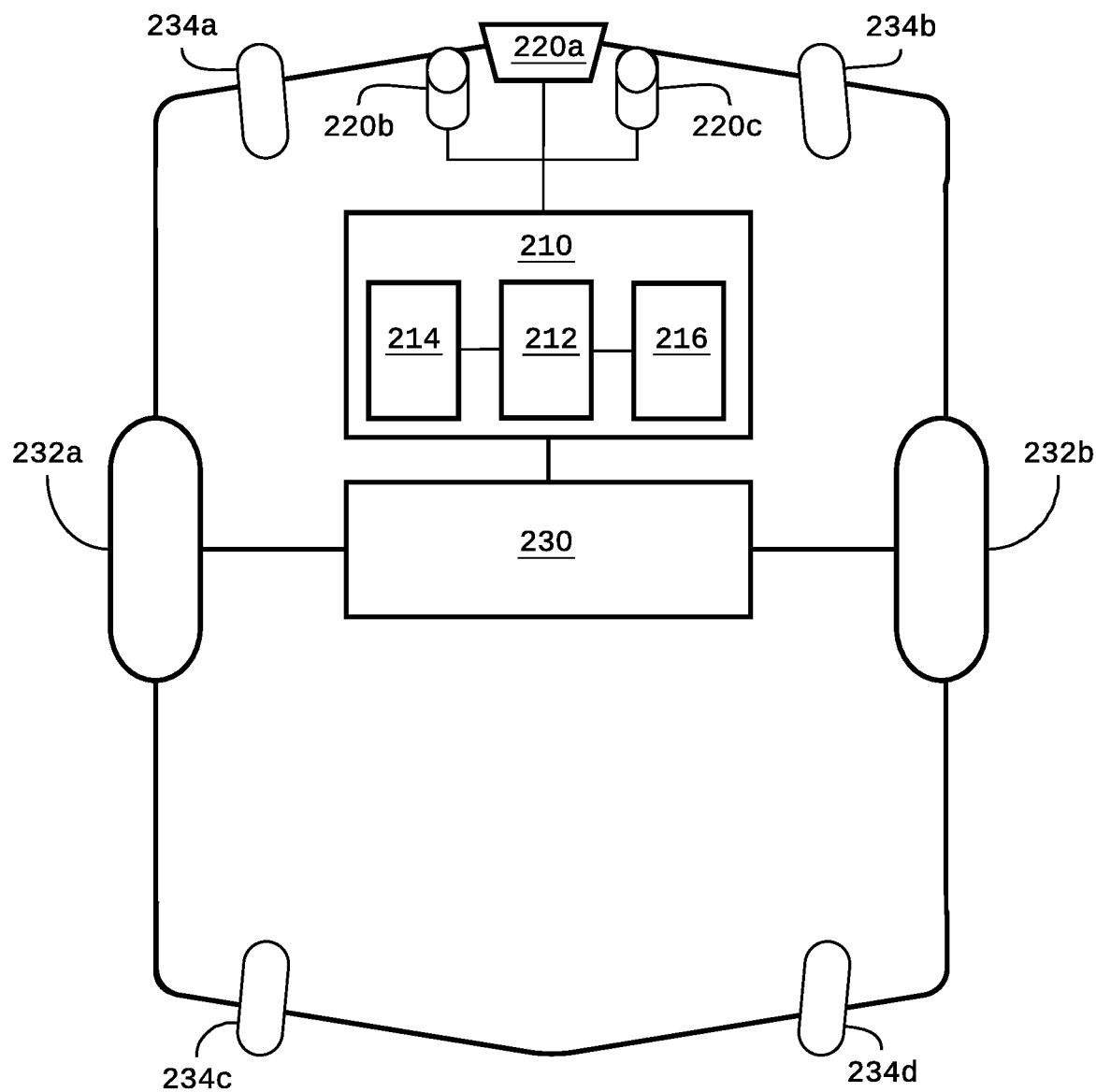
FIG. 3 is another block diagram of a self-driving material-transport vehicle, according to at least one embodiment.

Referring to FIG. 3, there is shown a block diagram of a self-driving material-transport vehicle 110, according to at least one embodiment. The drive system 230 includes a motor and/or brakes connected to drive wheels 232a and 232b for driving the self-driving material-transport vehicle 110. According to some embodiments, the motor may be an electric motor, a combustion engine, or a combination/hybrid thereof. According to some embodiments, there may be one motor per drive wheel, for example, one for drive wheel 232a and one for drive wheel 232b. Depending on the particular embodiment, the drive system 230 may also include control interfaces that can be used for controlling the drive system 230. For example, the drive system 230 may be controlled to drive the drive wheel 232a at a different speed than the drive wheel 232b in order to turn the self-driving material-transport vehicle 110. Different embodiments may use different numbers of drive wheels, such as two, three, four, etc.

According to some embodiments, additional wheels 234 may be included (as shown in FIG. 3, the wheels 234a, 234b, 234c, and 234d may be collectively referred to as the wheels 234). Any or all of the additional wheels 234 may be wheels that are capable of allowing the self-driving material-transport vehicle 110 to turn, such as castors, omni-directional wheels, and mecanum wheels.

According to some embodiments, the sensors 220 (as shown in FIG. 3, the sensors 220a, 220b, and 220c may be collectively referred to as the sensors 220) may be optical sensors arranged in a manner to provide three-dimensional (e.g. binocular or RGB-D) imaging.

The positions of the components 210, 212, 214, 216, 220, 230, 232, and 234 of the self-driving material-transport vehicle 110 are shown for illustrative purposes and are not limited to the shown positions. Other configurations of the components 210, 212, 214, 216, 220, 230, 232, and 234 are possible.

Figure 4:
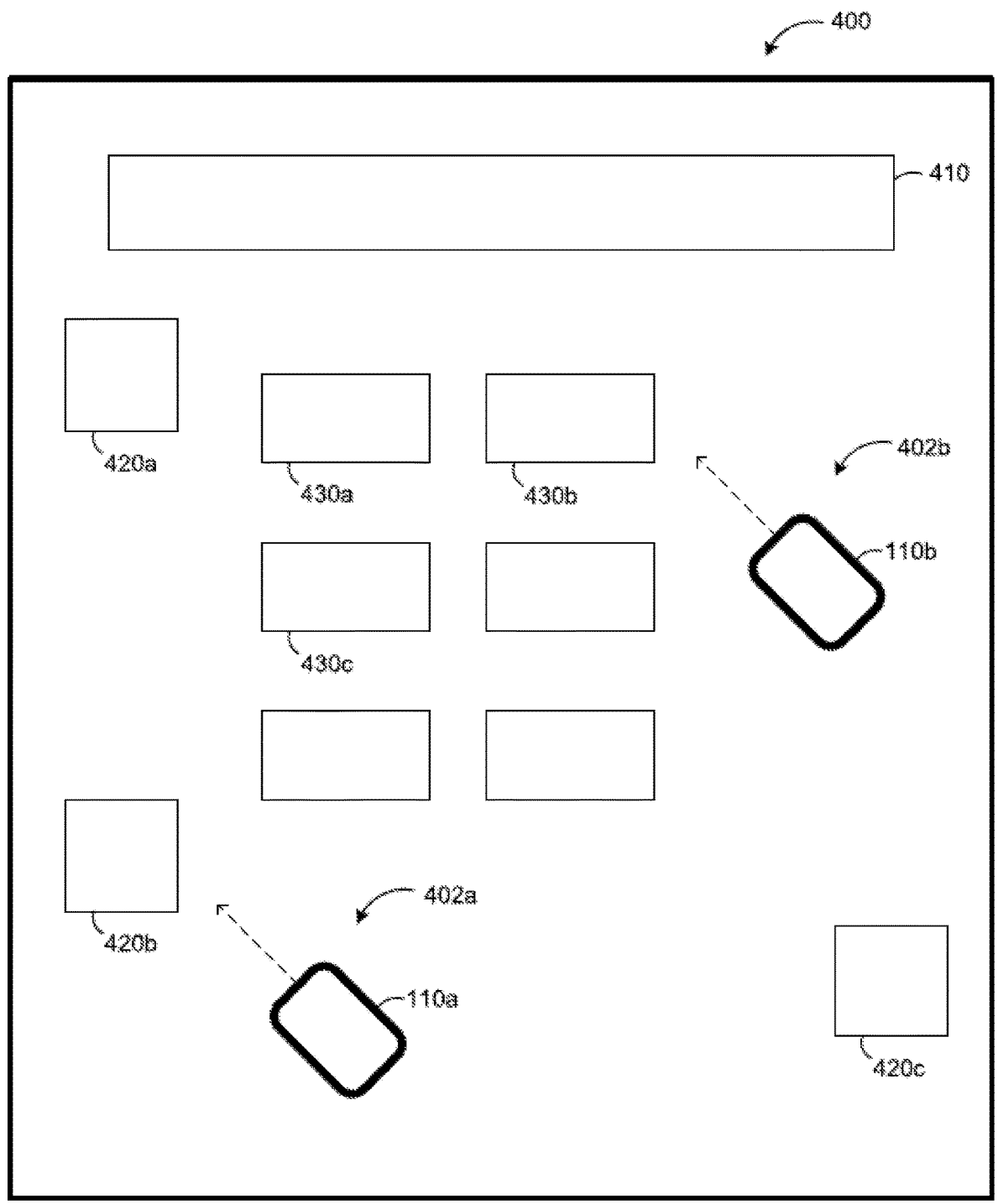
FIG. 4 is a diagram of an example layout of a facility and self-driving material-transport vehicles located therein, according to at least one embodiment.

Referring now to FIG. 4, there is shown a diagram of an example layout 400 of a facility. A facility can be any place with a particular purpose. Example facilities include, but are not limited to, manufacturing plants, warehouses, offices, hospitals, hotels, and restaurants.

A self-driving material-transport vehicle 110 may travel between various points within a facility to pick-up and deliver items, to monitor the facility, or to collect data within the facility. For example, in a manufacturing plant, a self-driving material-transport vehicle 110 may pick-up and deliver items to and from the assembly line, staging stations, and/or storage shelves.

As shown in layout 400, the facility can have a number of obstacles in the self-driving material-transport vehicle's path, such as shelf 410, staging stations 420a, 420b, and 420c, and pallets 430a, 430b and 430c. Obstacles can be permanent objects, such as wall or pillars. Obstacles can also be temporary or transient objects, such as carts, crates, bins, and pallets. The self-driving material-transport vehicle 110 may need to navigate around the obstacles in order to complete its mission.

Self-driving material-transport vehicles 110a and 110b each have a position 402a and 402b respectively, within the facility. A position 402a and 402b can be characterized by a coordinate and a heading in the coordinate system of the electronic map. For example, if an electronic map uses an x-y coordinate system, the coordinates can be defined in terms of x and y and a heading can be yaw (angle) in the x-y plane. As shown in FIG. 4, positions 402a and 402b have a same heading but different coordinates.

Figure 5:
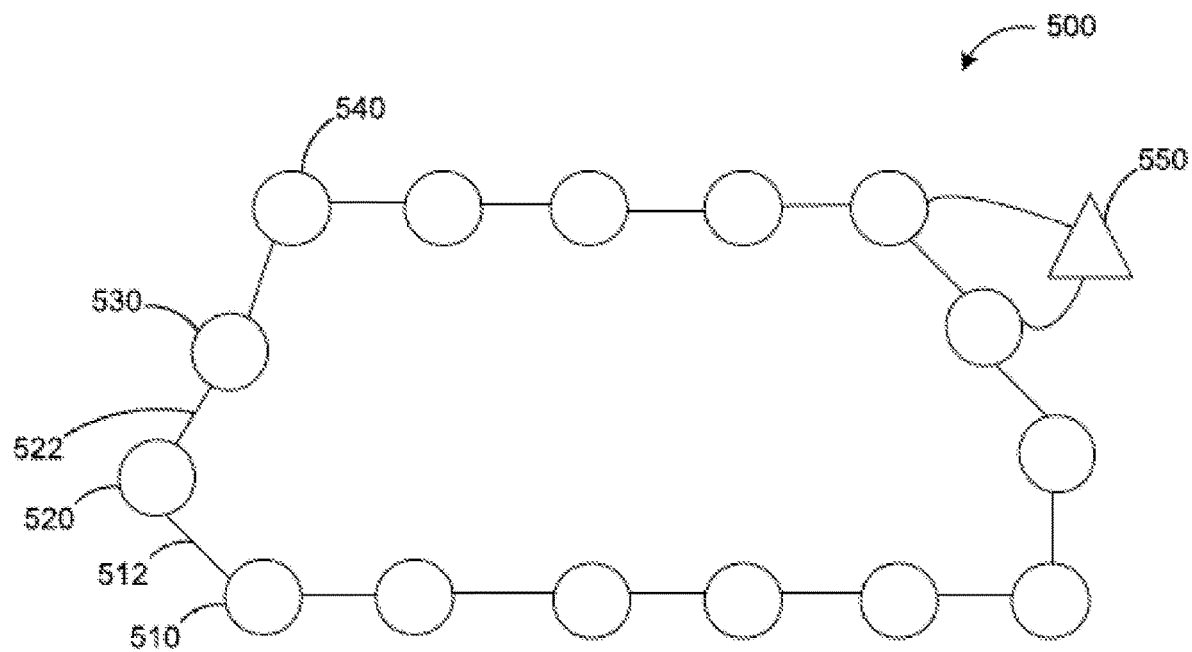
FIG. 5 is an illustration of an electronic map, according to at least one embodiment.

Referring now to FIG. 5, there is shown an illustration of an electronic map 500, according to at least one embodiment. An electronic map 500 can include a set of map vertices such as map nodes 510, 520, 530, and 540 and map features 550.

Each map node 510, 520, 530, and 540 can include a stored image data associated with a position within the facility. The position stored in a map node can relate to the position of the self-driving material-transport vehicle 110 at the time that the associated image data was observed. According to some embodiments, image data can include an image itself, or a frame of video. According to some embodiments, image data can include LiDAR data. In some embodiments, image data can relate to data obtained from processing the image, such as feature detection, extraction and/or classification. Each map node may differ in the properties and/or source of the stored image data.

Similar to a map node, a map feature 550 is also associated with a position within the facility. However, map features store user-generated map data such as waypoints, zones, and docks, etc.

Referring back to FIG. 4, map node 520 can be associated with the position 402a of self-driving material-transport vehicle 110a in a facility having layout 400. The stored image data of map node 520 in electronic map 500 can relate to the presence of obstacle 420b. In electronic map 500, map node 520 is connected along edge 512 to neighbor map node 510. Map node 520 is also connected along edge 522 to neighbor map node 530.

Each vertex can be connected to at least one other vertex, thereby forming a graph. The connection between two vertices can be referred to as an edge 512 and 522. In some embodiments, each vertex is connected to at least two other vertices.

The electronic map 500 is shown for illustrative purposes and is not limited to the structure shown. Other structures of electronic maps are possible.

Figure 6:
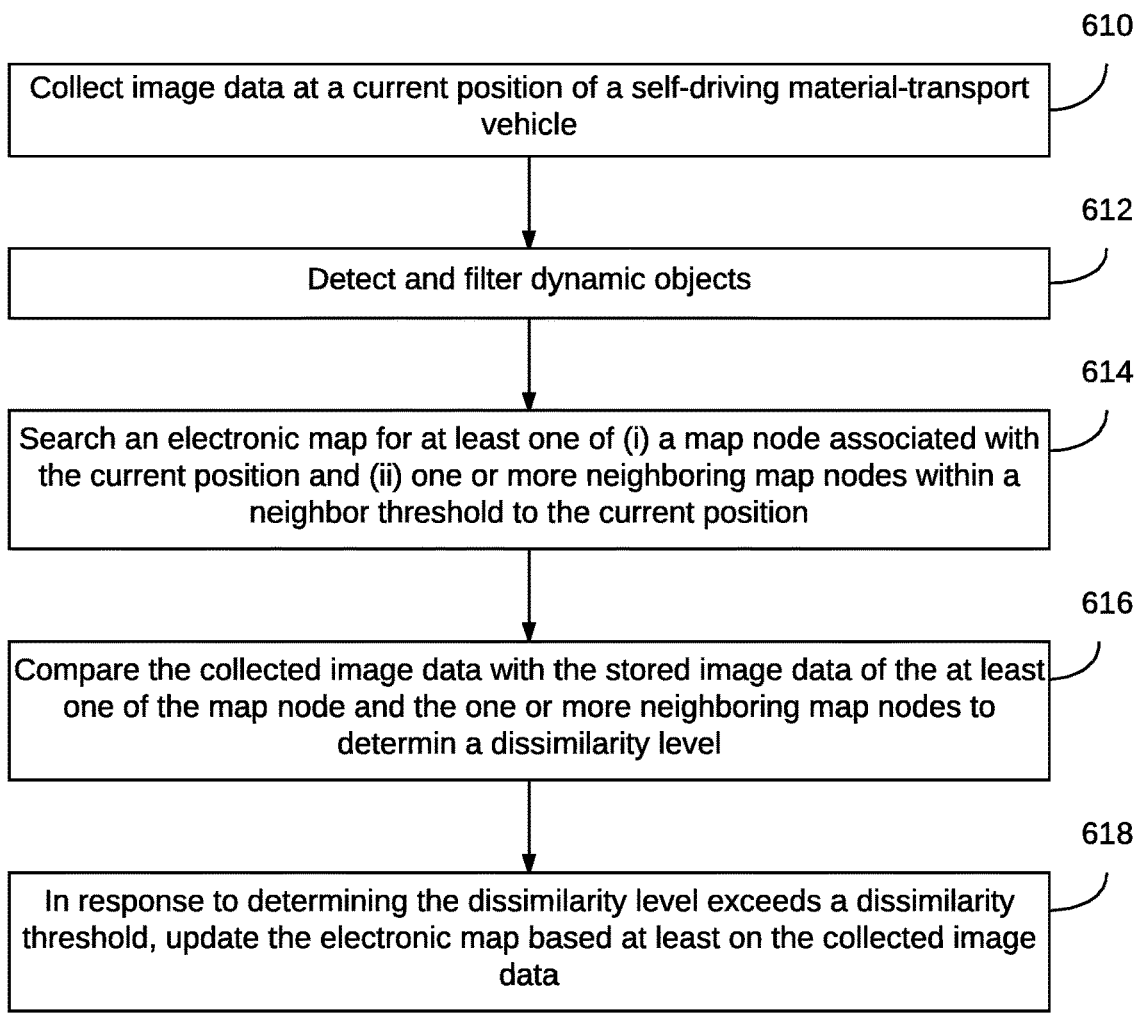
FIG. 6 is a method of updating an electronic map of a facility, according to at least one embodiment.

Referring now to FIG. 6, there is shown a method 600 of updating an electronic map 600 of a facility, according to at least one embodiment. The method 600 can be carried out by a self-driving material-transport vehicle 110, such as using the processor 212, memory 214, and one or more sensors 220.

The method 600 begins at step 610, when image data at a current position of the self-driving material-transport vehicle 110 is collected. The self-driving material-transport vehicle 110 can collect image data while conducting a mission in the facility, or while waiting to receive a mission. According to some embodiments, the vehicle can execute a remapping mission specifically in order to update the map with the facility, or within a particular zone of the facility. In some embodiments, the self-driving material-transport vehicle 110 can operate in the facility for the purpose of maintaining the electronic map.

At step 612, image data pertaining to dynamic objects may be detected and filtered according to some embodiments. Dynamic objects, as described here, are objects within the image data that do not represent map objects. For example, a human pedestrians and other vehicles are generally considered to be dynamic objects. According to some embodiments, dynamic objects may be detected based on matching image data to known data representing dynamic objects, the temporal characteristics of the data (e.g. whether the object is moving between one image and another, or within a video; the speed of movement, etc.). Once a dynamic object has been detected in the image data, the dynamic object may be filtered out so that it is not used within the map.

At step 614, an electronic map 500 is searched for at least one of (a) a map node associated with the current position and (b) one or more neighboring map nodes within a neighbor threshold to the current position. A neighboring map node is a map node that does not share the same current position but has a position that is relatively nearby or local to the current position. In some embodiments, determining whether a map node is a neighbor can be based on a neighbor threshold. In some embodiments, map nodes must be connected to a map node in order to be a neighbor map nodes. In some embodiments, neighbor map nodes do not need to be connected to map nodes in order to be a neighbor map node.

In some embodiments, a neighbor threshold can relate to a distance between map node positions. In some embodiments, a neighbor threshold can relate to a pre-defined distance between map node coordinates. For example, a neighbor threshold can be 15 meters. Two map nodes that have coordinates that are 20 meters apart would not be considered neighbor map nodes. However, two map nodes that have coordinates that are 10 meters apart could be considered neighbor map nodes. In some embodiments, a neighbor threshold in the range of about 10 meters to 20 meters is preferred.

In some embodiments, a neighbor threshold can relate to a pre-defined maximum number of map nodes. For example, a neighbor threshold can be 15 meters and a maximum of three map nodes. If a first map node has a distance of 6, 7, 11, 12, and 14 meters away from five other map nodes respectively, only three map nodes that are shortest in distance from the first map node will be considered a neighbor map node. In some embodiments, a neighbor threshold of about 4 map nodes is preferred.

In some embodiments, the electronic map can be searched for a map node associated with the current position. If it is determined that a map node associated with the current position does not exist in the electronic map, the electronic map can be searched again for one or more neighboring map nodes within the neighbor threshold to the current position. That is, in some embodiments, the method 600 may not search for one or more neighboring map nodes within the neighbor threshold to the current position because a map node associated with the current position is already found.

At step 616, the image data collected at step 610 is compared with the stored image data. When a map node for the current position exists, comparing the collected image data with the stored image data can involve comparing the collected image data with the stored image data of the map node for the current position. When a map node for the current position does not exist, comparing the collected image data with the stored image data can involve comparing the collected image data with the stored image data of the one or more neighboring map nodes.

Collected image data can be compared with stored image data (of either the map node or the one or more neighboring map nodes) in order to determine a dissimilarity level. In some embodiments, comparing the collected image data with the stored image data can involve determining a number of mismatched points between the collected image data and the stored image data and determining the dissimilarity level based on the number of mismatched points and a total number of points of the collected image data. In some embodiments, the dissimilarity level can be a ratio of the number of mismatched points to the total number of points of the collected image data.

Figure 7A:
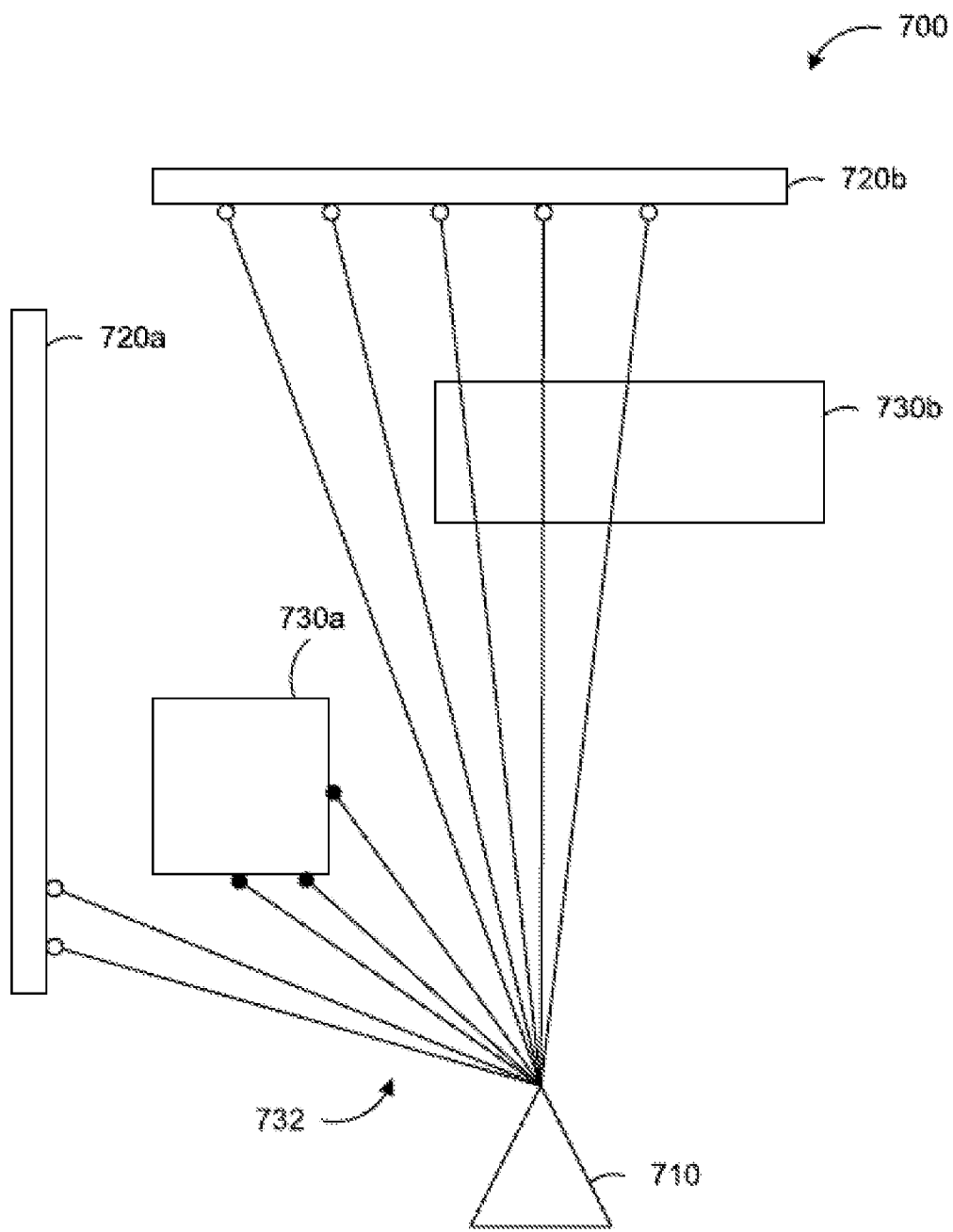
FIG. 7A is a diagram of an example of a laser scan.

Mismatched points between the collected image data and the stored image data can be a result of projection errors or reprojection errors in laser scans. Referring now to FIG. 7A, there is shown a diagram of an example of a laser scan 700. Laser scanner 710 can emit laser beams 732 towards obstacles 720 and 730 (as shown in FIG. 7A, the obstacles 720a, 720b, 730a, and 730b may be collectively referred to as 720 and 730). The laser beams 732 reflect back to the laser scanner 710, where the return time is measured. The time difference between the initial laser beam 732 and the return of the reflected laser beam can be used to determine the distance of obstacles relative to the laser scanner 710.

Figure 7B:
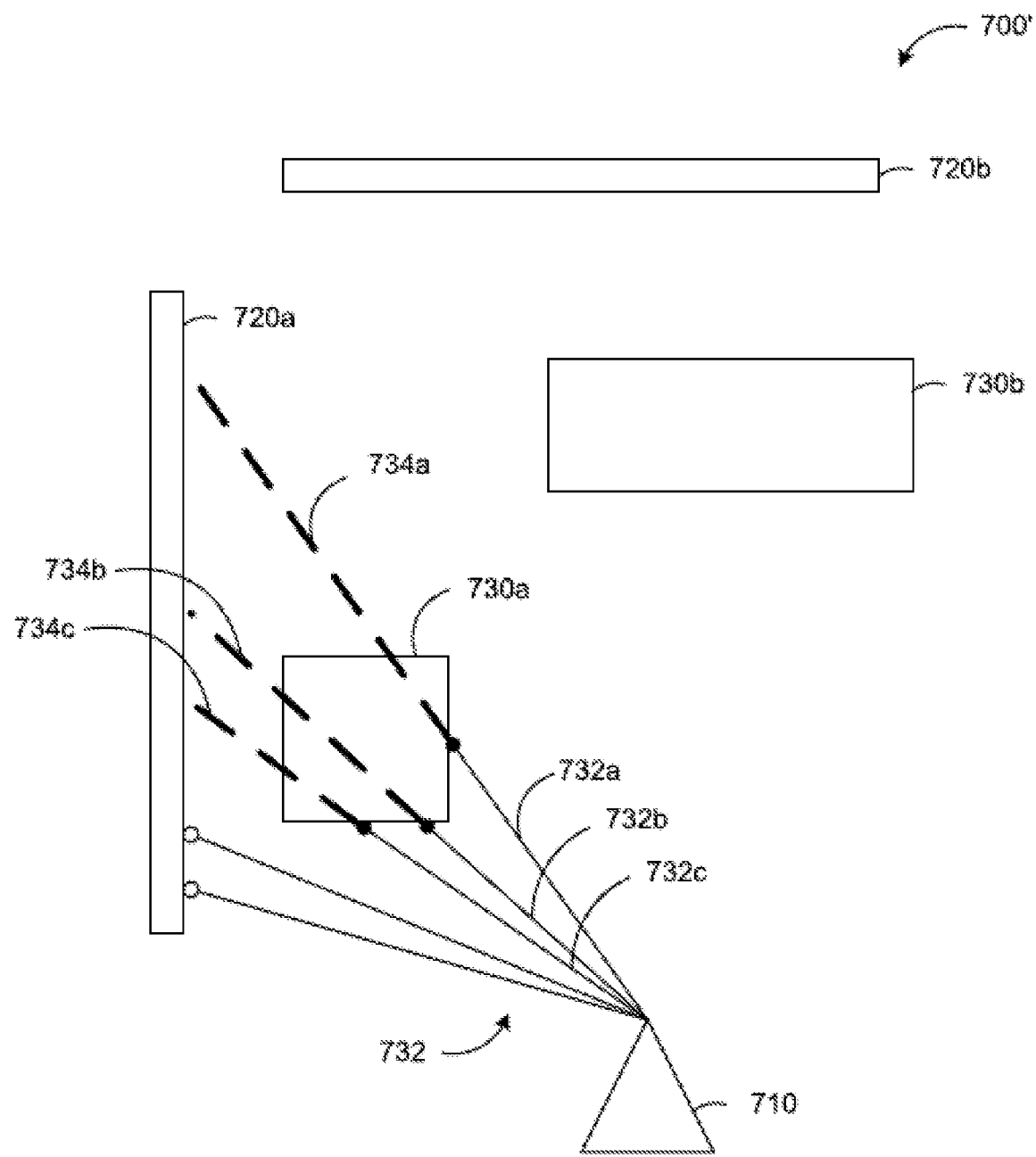
FIG. 7B is a diagram of projection error when a laser scan is compared with an electronic map, according to at least one embodiment.

Referring now to FIG. 7BB, there is shown a diagram 700' of projection error when collected image data from a laser scan 700' is compared with stored image data in an electronic map, according to at least one embodiment. Projection error can occur when stored image data relates to a laser scan 700' taken by laser beams 732a, 732b, and 732c in the absence of obstacle 730a and the collected image data relates to a laser scan 700' taken by laser beams 734a, 734b, and 734c in the presence of obstacle 730a. The presence or absence of obstacle 730 can result in a slight offset in the features detected. The slight offset in the features detected can result in mismatched points. If the mismatch exceeds an offset threshold, the difference is considered a projection error.

Figure 7C:
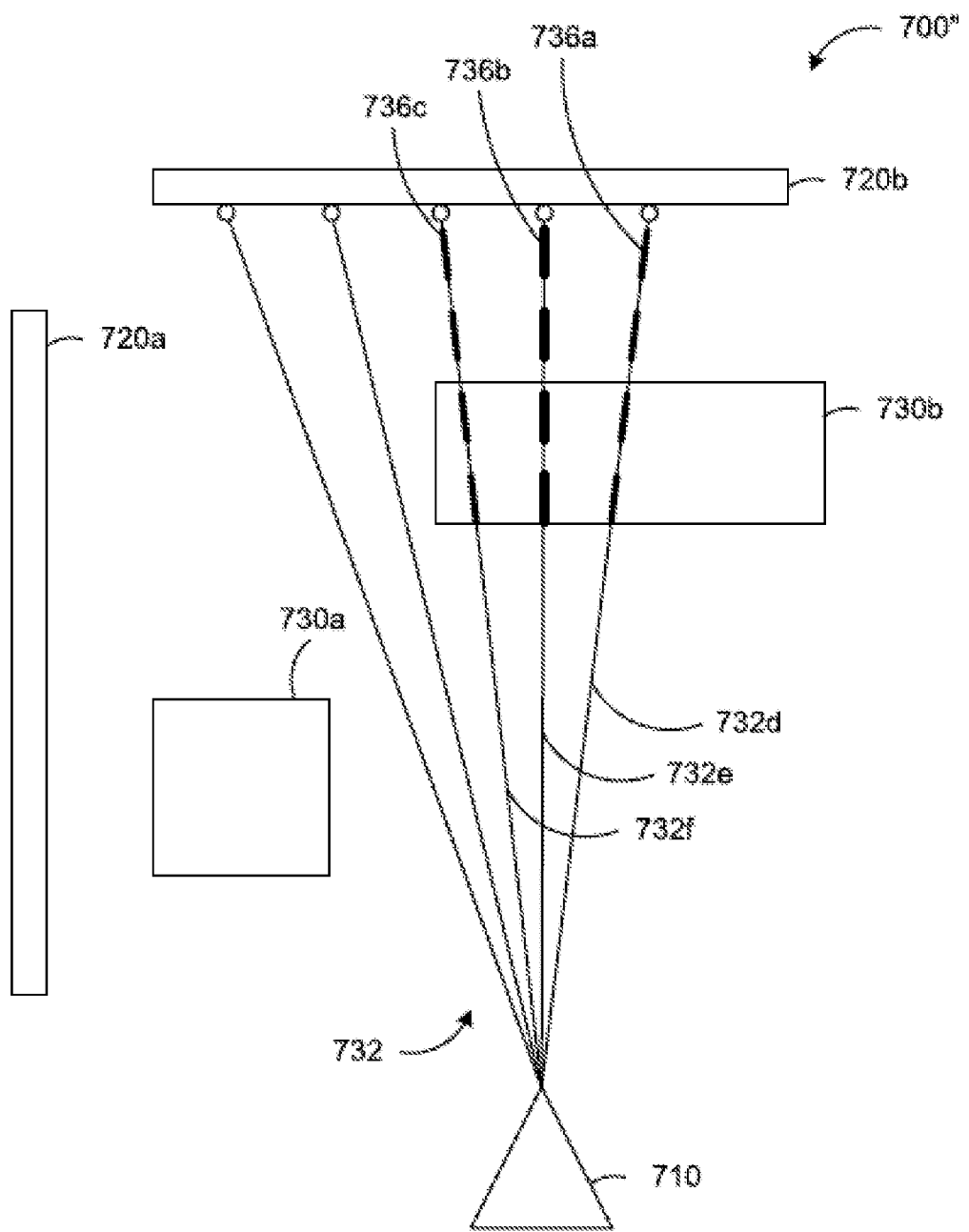
FIG. 7C is a diagram of reprojection error when a laser scan is compared with an electronic map, according to at least one embodiment.

Referring now to FIG. 7C, there is shown a diagram 700" of reprojection error when collected image data from a laser scan 700" is compared with stored image data in an electronic map, according to at least one embodiment. Projection error can occur when stored image data relates to a laser scan 700" taken by laser beams 732d, 732e, and 732f in the presence of obstacle 730b and the collected image data relates to a laser scan 700" taken by laser beams 736a, 736b, and 736c in the absence of obstacle 730b. The presence or absence of obstacle 730 can result in a slight offset in the features detected. The slight offset in the features detected can result in mismatched points. If the mismatch exceeds an offset threshold, the difference is considered a reprojection error.

Figure 8A:
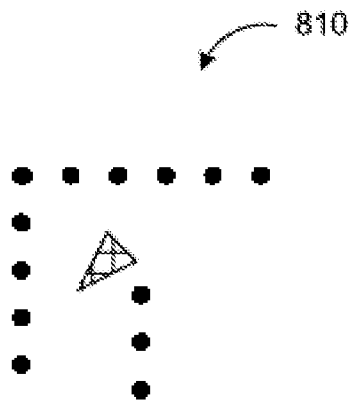
FIG. 8A is a diagram of a first laser scan.
Figure 8B:
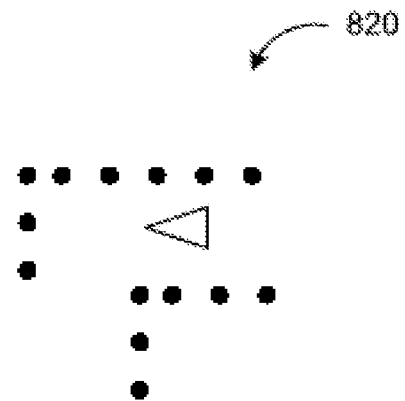
FIG. 8B is a diagram of a second laser scan.
Figure 8C:
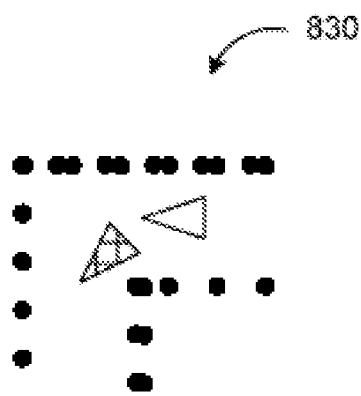
FIG. 8C is a diagram of an alignment of the first laser scan of FIG. 8A and the second laser scan of FIG. 8B.

In order to compare collected image data and stored image data, it can be necessary to align a reference from the collected image data with a reference frame for the stored image data. Referring to FIGS. 8A, 8B, and 8C, shown therein is a diagram of a first laser scan 810; a diagram of a second laser scan 820; and a diagram of an alignment 830 of the first laser scan of FIG. 8A and the second laser scan 820 of FIG. 8B. In some embodiments, the alignment 830 can be obtained by determining a transformation between the first laser scan 810 and the second laser scan 820. Various techniques for determining a transformation can be used, including but not limited to iterative closest point.

Referring back to FIG. 6, at step 618, if the dissimilarity level exceeds a dissimilarity threshold, the electronic map can be updated based at least on the image data collected at step 610.

In some embodiments, the dissimilarity threshold relates to a minimum mismatch between the collected image data and the stored image data that indicates the electronic map is outdated. In some embodiments, the dissimilarity threshold can be static, that is, a pre-defined dissimilarity threshold. In some embodiments, the dissimilarly threshold can be in the range of approximately 30% to 40% dissimilarity.

In some embodiments, the dissimilarity threshold can be dynamic. For example, the dissimilarity threshold can be selected based on a facility type of the facility and/or one or more prior updates to the electronic map. For example, in some embodiments, the dissimilarity threshold can be higher immediately after an update to the electronic map and conversely, the dissimilarity threshold can be lower if an extended period of time has elapsed since an update to the electronic map. In some embodiments, a facility that has continuous activity and more frequent changes can have a higher dissimilarity threshold than a facility that has less activity and relatively less frequent changes.

When the electronic map includes a map node associated with the current position, updating the electronic map based at least on the collected image data involves replacing the stored image data of the map node with the collected image data.

Figure 9A:
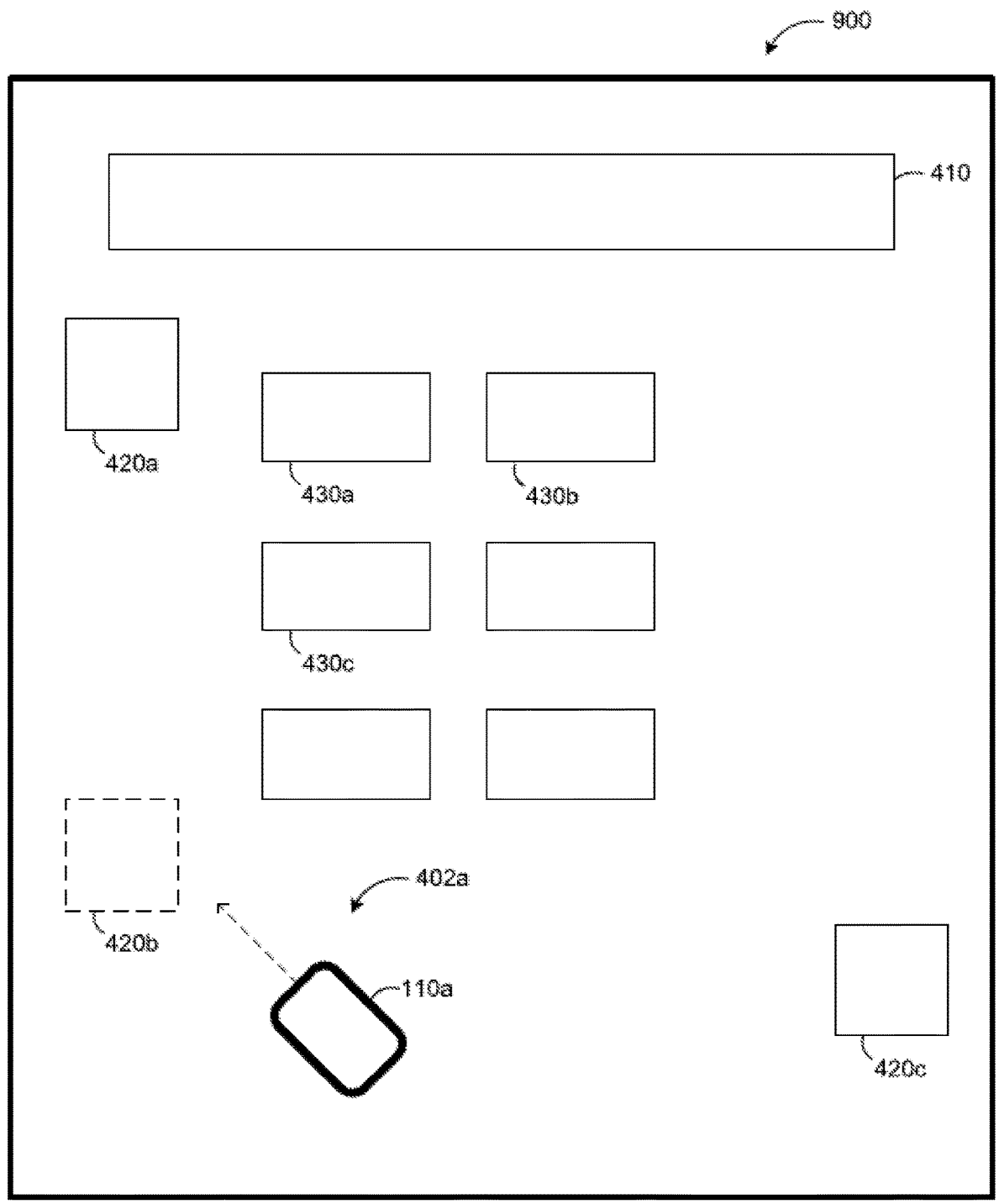
FIG. 9A is a diagram of a self-driving material-transport vehicle located in the facility shown in FIG. 5 having a second layout, according to at least one embodiment.
Figure 10A:
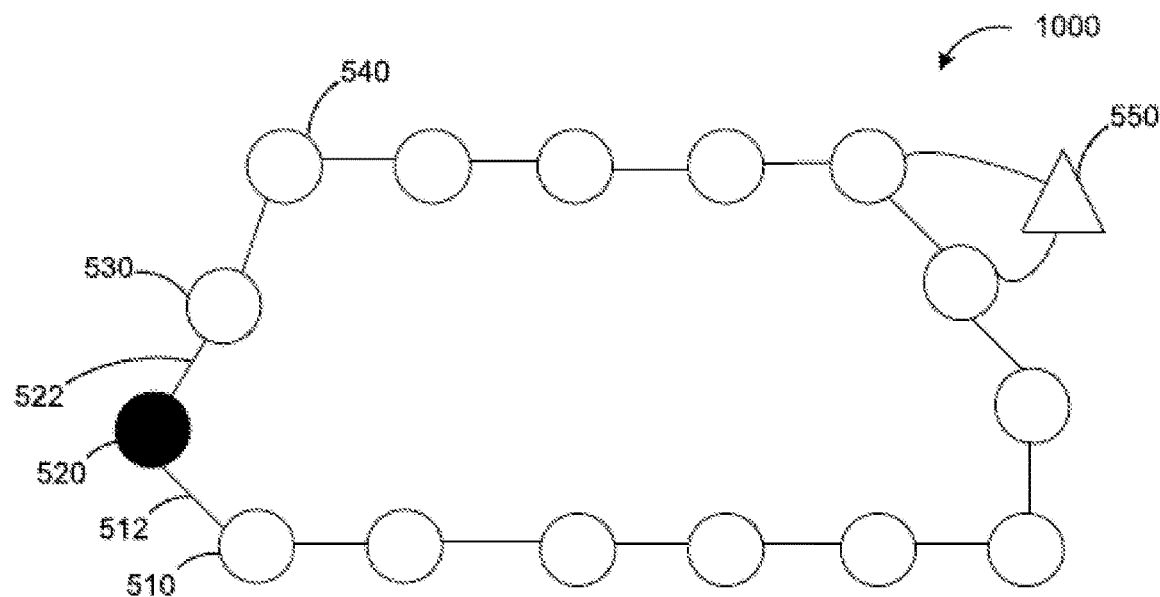
FIG. 10A is an illustration of replacing stored image data of a map node of an electronic map, according to at least one embodiment.

Referring now to FIGS. 9A and 10A, there is shown another layout 900 of the facility and an updated electronic map 1000. Layout 900 is similar to layout 400 with the exception that obstacle 420b is removed (indicated by stippled lines) in layout 900. If the self-driving material-transport vehicle 110a collects image data of layout 900 at position 402a, the electronic map 500 can be updated by replacing the stored image data of map node 520, with the collected image data. An update to the stored image data of map node 520 is indicated by shading of map node 520 in electronic map 1000 of FIG. 9A.

In some embodiments, collected image data for a map node can be similar to stored image data of a neighboring map node. If stored image data for a map node is replaced with collected image data that is similar to stored image data of a neighboring map node, the electronic map is larger than necessary. In order to reduce redundancy in the electronic map, the collected image data can be compared with the stored image data of neighboring map nodes to determine the dissimilarity level. If the dissimilarity level exceeds a node removal threshold, the neighboring map node can be removed from the electronic map.

Figure 10B:
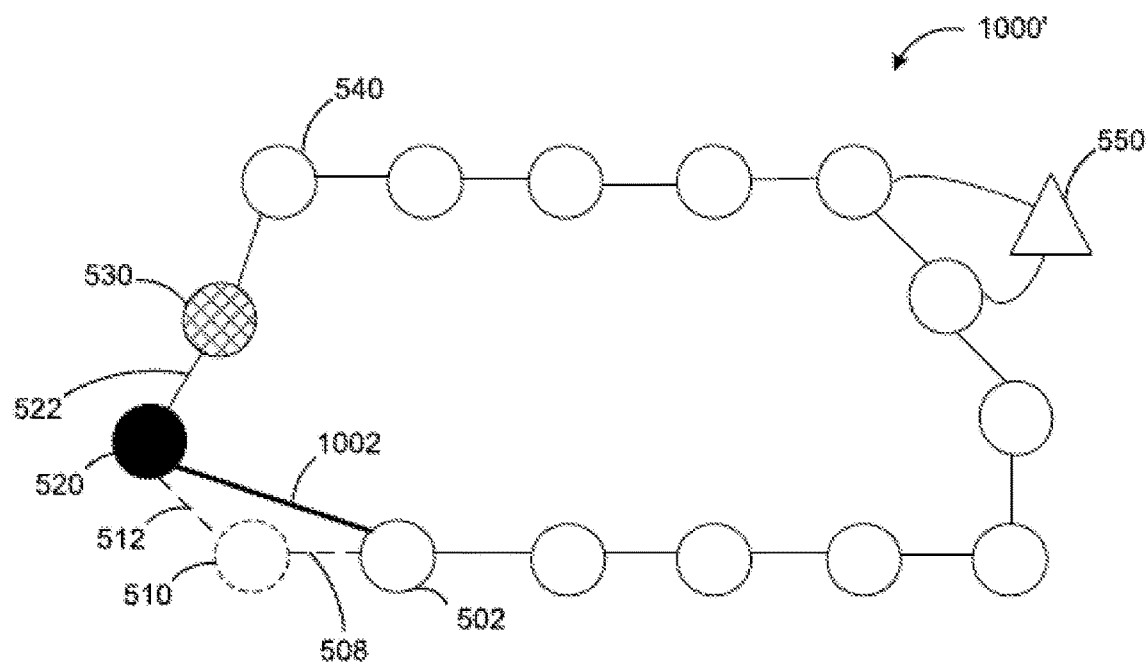
FIG. 10B is an illustration of a updating neighbor map nodes of an electronic map, according to at least one embodiment.

Referring now to FIG. 10B, there is shown another updated electronic map 1000'. After map node 520 of electronic map 1000 is updated with collected image data, the collected image data can be compared with the stored image data of map nodes 510 and 530. A dissimilarity level between the collected image data for map node 520 and each of stored image data for neighboring map nodes 510 and 530 can be determined. If the dissimilarity level with respect to neighboring map node 510 exceeds a node removal threshold, the neighboring map node can be removed. To remove a map node, edges connecting the map node and the map node itself can be removed.

For example, edge 512 previously connecting 510 and 520 and edge 508 previously connecting 510 and 502 can be removed. A new, composite edge 1002, connecting map node 520 to map node 502 can be added to maintain connectivity of the electronic map 1000'. In some embodiments, the node removal threshold is greater than the dissimilarity threshold. In some embodiments, the node removal threshold is approximately 50% to 70% dissimilarity.

Figure 9B:
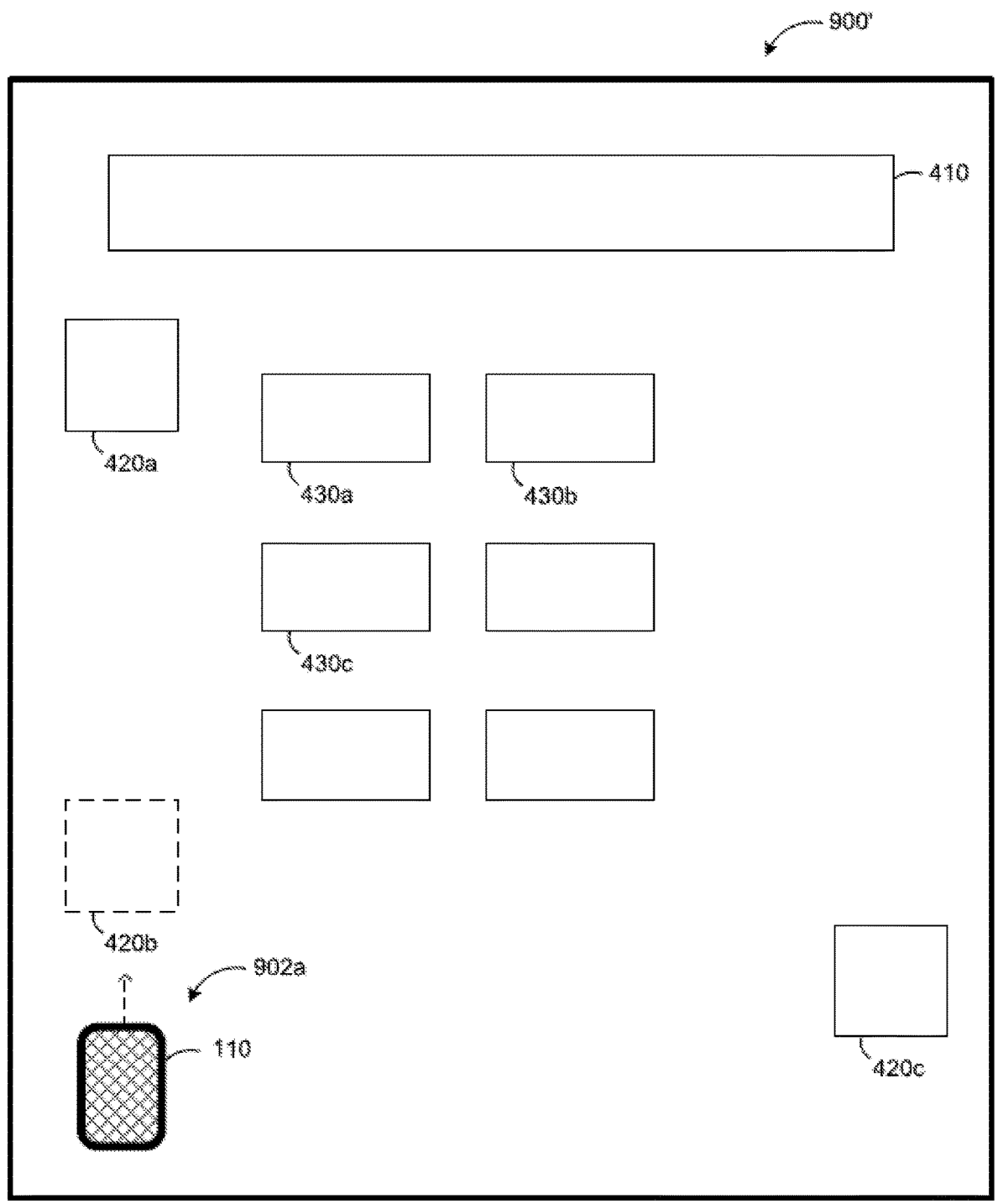
FIG. 9B is a diagram of a self-driving material-transport vehicle in a second position in the facility having the layout shown in FIG. 9A, according to at least one embodiment.

In some embodiments, updating a map node can involve updating one or more neighboring map nodes. Referring back to FIGS. 5, 9B and 10B, map node 530 can be associated with the position 902a of self-driving material-transport vehicle 110. The presence of obstacle 420b in layout 400 can be captured in stored image data of map node 530 in electronic map 500. When map node 520 is updated based on collected image data at position 402 showing that the obstacle 420b is removed, map node 530 can also be updated to capture the absence of obstacle 420b. An update to the stored image data of map node 530 is indicated by cross-hatching of map node 530 in electronic map 1000' of FIG. 10B.

When the electronic map does not include a map node associated with the current position, then updating the electronic map based at least on the collected image data involves adding a new map node to the electronic map for the current position and storing the collected image data at the new map node. In some embodiments, adding a new map node involves connecting the new map node to at least one existing map nodes of the electronic map. In some embodiments, adding a new map node involves connecting the new map node to at least two existing map nodes of the electronic map.

Figure 11A:
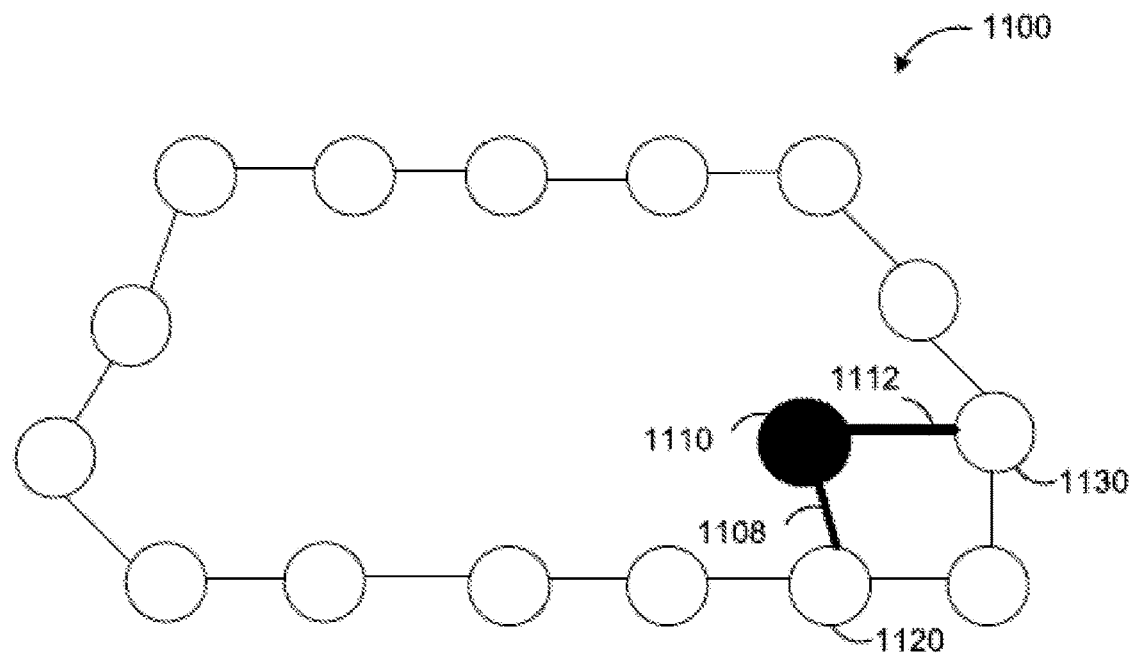
FIG. 11A is an illustration of adding a map node to an electronic map, according to at least one embodiment.

Referring now to FIG. 11A, there is shown an illustration of an electronic map 1100, according to at least one embodiment. A new map node 1110 has been added to the electronic map 1100. Edges 1112 and 1114 are also added to the electronic map 1100 in order to connect map node 1110 to existing map nodes 1120 and 1130. The collected image data is stored in association with map node 1110, along with the position of the self-driving material-transport vehicle 110 at the time that the image data is collected.

In some embodiments, an electronic map can require map nodes to have positions that are sufficiently distinct from other map nodes. After adding a new map node, the method 400 can further involve determining whether the electronic map includes one or more excessive neighboring map nodes relative to the new map node. An excessive neighboring map node can be a map node associated with a position that is less than an excessive neighbor distance from the current position of the new map node. In response to determining that the electronic map includes one or more excessive neighboring map nodes, the one or more excessive neighboring map nodes can be removed from the electronic map. In some embodiments, an excessive neighbor distance can be a minimum distance between two map nodes of the electronic map.

Figure 11B:
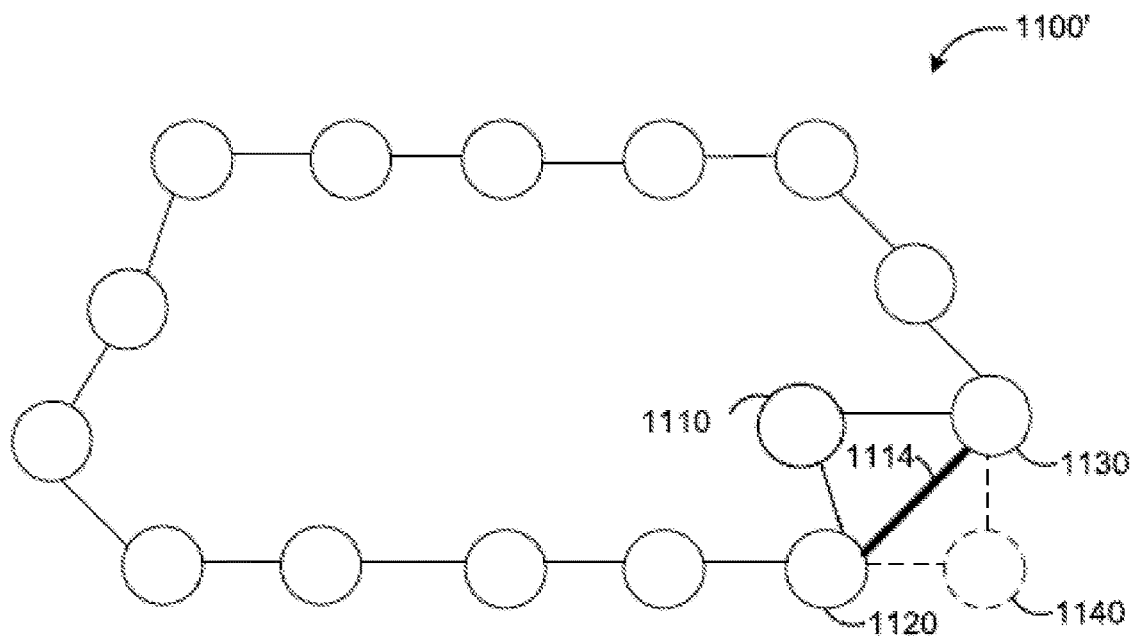

Referring now to FIG. 11B, there is shown an illustration of an electronic map 1100', according to at least one embodiment. After adding new map node 1110 in electronic map 1100, the method determines the distance between new map node 1110 and neighbor map nodes 1120, 1130, and 1140. In this example, the distance between map nodes 1110 and 1140 is less than the excessive neighbor distance. Map node 1140 is removed (shown as stippled lines) from the electronic map 1100' and a composite edge is formed to connect map nodes 1120 and 1140 and maintain the connectivity of the graph.

Once the electronic map has been updated, the electronic map can be used. The electronic map can be used for display on a user interface. The electronic map can be used by the self-driving material-transport vehicle 110 to identify and navigate its position in the facility.

Figure 12:
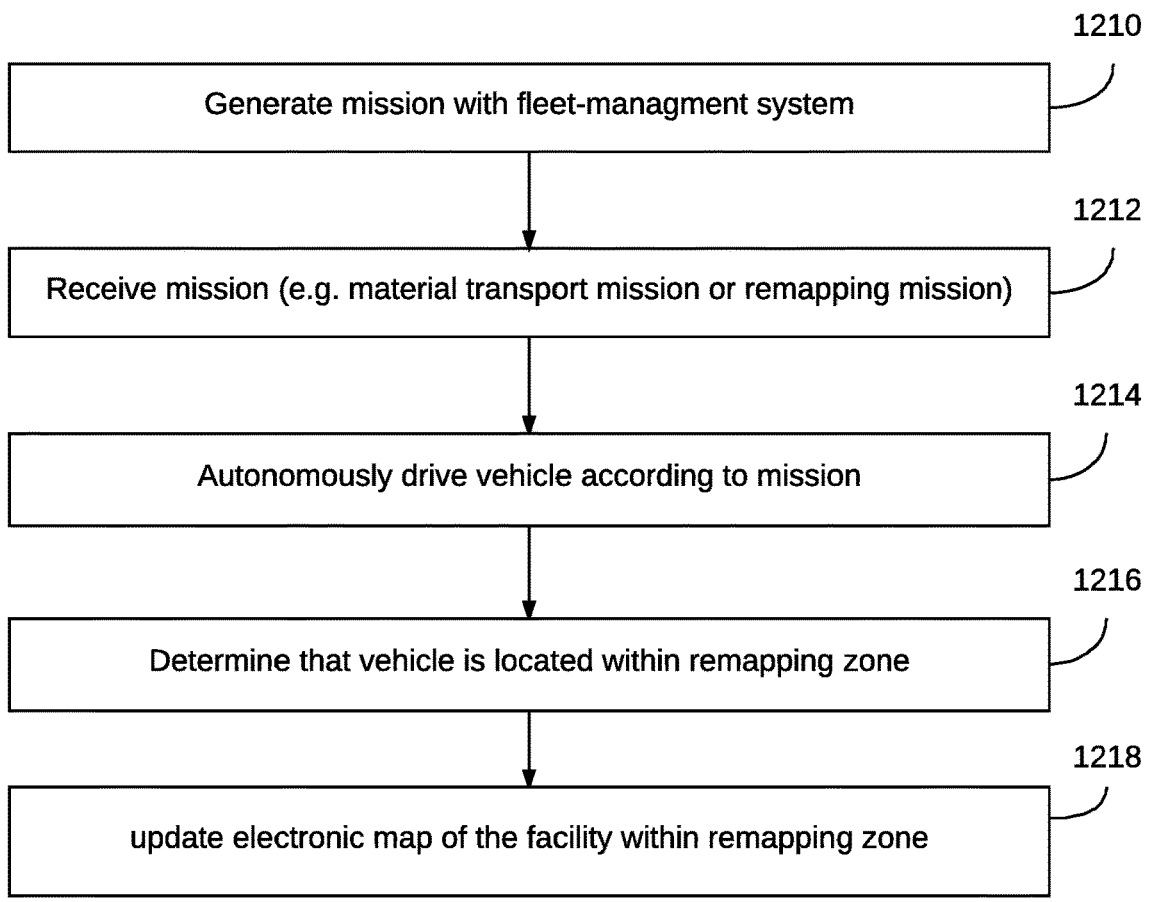
FIG. 12 is a flow diagram depicting a method for zone-based remapping of a facility, according to at least one embodiment.

Referring to FIG. 12, there is shown a method 1200 for zone-based remapping of a facility according to some embodiments. The method 1200 may include any or all of the steps described in respect of the method 600.

The method 1200 begins at step 1210 when a mission is generated, for example, using a fleet-management system. For the purposes of describing the method 1200, a distinction can be made between a "standard" mission and a "remapping" mission, though both types of missions general include providing a self-driving material-transport vehicle with instructions to execute a particular task with respect to particular locations.

According to some embodiments, the fleet-management system may generate a standard mission to be executed by a self-driving vehicle. As used herein, a "standard" mission is a mission that is generated independently of a need to map the facility. In some cases, a typical example of a standard mission is a material transport mission, such as picking up an item at one location and delivering it to another location.

In the event that a standard mission is generated, then the method 1200 may generally be used along with the standard mission in order to provide for continuous mapping/remapping of the facility.

According to some embodiments, the fleet-management system may generate a remapping mission to be executed by a self-driving vehicle. As used herein, a "remapping" mission is a mission that is generated specifically in order to map or remap part or all of the facility. For example, a remapping mission may comprise sending a vehicle to a particular location or series of locations (e.g. within a defined zone) while executing the continuous mapping/remapping systems and methods described herein.

The fleet-management system may generate a remapping mission according to various criteria. According to some embodiments, a remapping mission may pertain to a specific location or region within the facility (a "remapping zone"), or to the entire facility itself (e.g. a remapping zone may comprise the entire facility).

According to some embodiments, a criterion for a remapping mission may be the age of the map data (e.g. a maximum data age threshold). In other words, if a certain amount of time has passed since continuous mapping/remapping was last performed, a remapping mission can be generated. According to some embodiments, this time-based criterion can also be combined with a location-based criterion such that a maximum data age threshold can be set for a particular remapping zone within the facility. For example, a remapping zone may be defined for an area within the facility in which large volumes of inventory are regularly being moved, and the corresponding maximum data age threshold may be set low relative to other areas of the facility. In other words, for areas of a facility that are known to incur map changes, remapping missions can be established in order to ensure that the map is constantly up-to-date for these areas.

According to some embodiments, a criterion for a remapping mission may be an event that occurs via an enterprise resource planning ('ERP') system, a manufacturing execution system ("MES"), or another system (collectively referred to as business-level logic systems), and/or a fleet-management system. For example, if a known inventory shipment causes a large volume of inventory to be displaced within the facility, the fleet-management system can receive a signal from the business-level logic system indicated that the event has occurred, and this signal can be used to trigger the generation of a remapping mission, which may pertain to a remapping zone corresponding to the area(s) in which the inventory was displaced.

In some cases, a hybrid mission may be generated that incorporates a remapping mission into a standard mission. A hybrid mission may be generated, for example, when a standard mission is required and the execution of the standard mission is expected to take a vehicle in or near a remapping zone. In this case, the standard mission can be made hybrid with a remapping mission such that the performs continuous mapping/remapping in the remapping zone while executing towards the objectives of the otherwise standard mission. According to some embodiments, the vehicle may travel a path that includes the locations pertaining to the "standard mission" aspects of the hybrid mission as well as locations pertaining to the "remapping mission" aspects of the hybrid mission.

At step 1212, the self-driving vehicle receives the mission from the fleet-management system. Generally, the mission comprises one or more locations associated with the map. The mission may be any of a standard mission, remapping mission, or hybrid mission.

At step 1214, the vehicle autonomously drives according to the mission. According to some embodiments, this comprises autonomously planning a path based on the vehicle's location, the mission (e.g. mission locations), and the electronic map.

At step 1216, the vehicle determines that it is located within a remapping zone. According to some embodiments, the vehicle may always (i.e. at every location) determine that it is in a remapping zone by default. For example, if the vehicle is executing a standard mission and is continuously mapping/remapping while executing the standard mission, the step 1216 is effectively moot, and the method continuous to step 1218.

According to some embodiments, the vehicle may only perform continuous mapping/remapping within particular remapping zones within the facility, which may be correlated with the electronic map. For example, if the vehicle is executing a standard mission, the vehicle may only execute continuous mapping/remapping while it is executing the standard mission and is travelling in a remapping zone while executing the standard mission.

According to some embodiments, the vehicle may only perform continuous mapping/remapping within particular remapping zones within the facility that are defined in a remapping mission. For example, if the vehicle is executing a remapping mission, the vehicle may only execute continuous mapping/remapping while it is executing the remapping mission and is travelling in the remapping zone associated with (or identified in) the remapping mission.

According to some embodiments, the vehicle may only perform continuous mapping/remapping within remapping zones within the facility that are comprise or are within a particular proximity to mission locations. For example, if the vehicle is executing a hybrid mission, the vehicle may only execute continuous mapping/remapping while it is within a remapping zone that it has encountered while traveling to or from standard mission locations. In other words, while travelling to or from standard mission locations, the vehicle may intentionally take a detour through a nearby remapping zone and perform continuous mapping/remapping within that remapping zone.

At step 1218, the vehicle updates the electronic map of the facility within the remapping zone as generally described herein. According to some embodiments, step 1218 may comprise the method 600 as previously described, or any set of steps or variations of the method 600.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method of operating a self-driving material transport vehicle to update an electronic map of a facility while the self-driving material transport vehicle is executing a mission, the method comprising:
   receiving, at the self-driving material transport vehicle, one or more mission instructions to initiate the self-driving material transport vehicle to execute one or more mission tasks at one or more destination locations within the facility;
   while the self-driving material transport vehicle travels towards a destination location of the one or more destination locations for executing the one or more mission tasks, concurrently operating the self-driving material transport vehicle to execute an electronic map update task separate from the one or more mission tasks, the electronic map update task comprising one or more map update instructions to operate the self-driving material transport vehicle to:
      monitor for arrival of the self-driving material transport vehicle at the destination location and automatically cease execution of the electronic map update task upon arrival at the destination location;
      collect image data at a current position of the self-driving material transport vehicle until the self-driving material transport vehicle arrives at the destination location, the image data representing one or more features observable from the current position; and
      reinitiate execution of the electronic map update task upon the self-driving material transport vehicle initiating travel from the destination location towards another destination location of the one or more destination locations to continue the mission; and
   following completion of the mission, operating the self-driving material transport vehicle to complete the electronic map update task, wherein the electronic map update task further comprises the one or more map update instructions to operate the self-driving material transport vehicle to:
      determine if the electronic map comprises a map node associated with the current position, wherein the electronic map comprises a set of map nodes, each map node being associated with a different location in the facility, and each map node comprises stored image data associated with a respective location within the facility,
      in response to determining that the electronic map does not include a map node associated with the current position, identify one or more neighboring map nodes within a neighbor threshold of the current position;
      compare the collected image data with the stored image data associated with one or more of (i) the map node associated with the current position, and (ii) at least one neighboring map node of the one or more neighboring map nodes, to determine a dissimilarity level;
      determine whether the dissimilarity level exceeds a dissimilarity threshold, the dissimilarity threshold being based on at least one of a facility type of the facility and one or more prior updates to the electronic map; and
      in response to determining the dissimilarity level exceeds the dissimilarity threshold, update the stored image data in association with one or more of: (i) the map node associated with the current position, and (ii) the at least one neighboring map node.

2. The method of claim 1, wherein comparing the collected image data with the stored image data comprises:
   determining a number of mismatched points between the collected image data and the stored image data; and
   determining the dissimilarity level based on the number of mismatched points and a total number of points.

3. The method of claim 1, wherein updating the map node associated with the current position comprises:
   replacing the stored image data of the map node with the collected image data.

4. The method of claim 1, wherein the electronic map update task further comprises the one or more map update instructions to operate the self-driving material transport vehicle to:
   determine the electronic map does not include the map node associated with the current position, add a new map node to the electronic map for the current position, and store at the new map node the collected image data.

5. The method of claim 1, wherein the electronic map update task further comprises the one or more map update instructions to operate the self-driving material transport vehicle to:
   for each neighboring map node of the one or more neighboring map nodes,
   compare the collected image data with the stored image data of that neighboring node of the one or more neighboring map nodes to determine the dissimilarity level; and
   in response to determining the dissimilarity level exceeds a node removal threshold, remove that neighboring map node of the one or more neighboring map nodes from the electronic map.

6. The method of claim 1, wherein the neighbor threshold comprises a maximum distance between a position of two map nodes.

7. The method of claim 1, wherein the dissimilarity threshold comprises a minimum mismatch between the collected image data and the stored image data to indicate the electronic map is outdated.

8. The method of claim 1, wherein the electronic map update task comprises one or more map update instructions to operate the self-driving material transport vehicle to:
   detect at least one dynamic object within the collected image data and filter the collected image data to remove the at least one dynamic object.

9. The method of claim 1, wherein the dissimilarity level exceeds the dissimilarity threshold if the collected image data indicates the addition or removal of at least one obstacle, and wherein the at least one obstacle is at least one non-dynamic object that obstructs navigation of the self-driving material-transport vehicle; and
   wherein the updating the stored image data is based at least on the addition or removal of at least one obstacle indicated by the collected image data at the current position.

10. A system for operating a self-driving material transport vehicle to update an electronic map of a facility while the self-driving material transport is executing a mission, the system comprising:
   one or more self-driving material transport vehicles operable to navigate the facility, a self-driving material-transport vehicle of the one or more self-driving material transport vehicles comprising:
      a memory to store the electronic map, the electronic map comprising a set of map nodes, each map node being associated with a different location in the facility, and each map node comprises a stored image data associated with a respective location within the facility;
      one or more sensors to collect image data at a current position of the at least one self-driving material transport vehicle until the at least one self-driving material transport vehicle arrives at a destination location of one or more destination locations within the facility, the image data representing one or more features observable from the current position; and
      a processor operable to:
         receive one or more mission instructions to initiate the self-driving material transport vehicle to execute one or more mission tasks at the one or more destination locations within the facility;
         while the self-driving material transport vehicle travels towards the destination location of the one or more destination locations for executing the one or more mission tasks, concurrently execute an electronic map update task separate from the one or more mission tasks, the electronic map update task comprising one or more map update instructions to:
            monitor for arrival of the self-driving material transport vehicle at the destination location and automatically cease execution of the electronic map update task upon arrival at the destination location; and
            reinitiate execution of the electronic map update task upon the self-driving material transport vehicle initiating travel from the destination location towards another destination location of the one or more destination locations to continue the mission; and
         following completion of the mission, complete the electronic map update task, wherein the electronic map update task further comprises the one or more map update instructions to:
            determine if the electronic map comprises a map node associated with the current position;
            in response to determining that the electronic map does not include a map node associated with the current position, identify one or more neighboring map nodes within a neighbor threshold of the current position;
            compare the collected image data with the stored image data associated with one or more (i) the map node associated with the current position, and (ii) at least one neighboring map node of the one or more neighboring maps nodes, to determine a dissimilarity level;
            determine whether the dissimilarity level exceeds a dissimilarity threshold, the dissimilarity threshold based on at least one of a facility type of the facility and one or more prior updates to the electronic map; and
            in response to determining the dissimilarity level exceeds the dissimilarity threshold stored in the memory, update the stored image data in association with one or more of: (i) the map node associated with the current position, and (ii) the at least one neighboring map node within a neighbor threshold to the current position.

11. The system of claim 10, wherein the electronic map update task further comprises the one or more map update instructions to:
   determine a number of mismatched points between the collected image data and the stored image data; and
   determine the dissimilarity level based on the number of mismatched points and a total number of points.

12. The system of claim 10, wherein the electronic map update task further comprises the one or more map update instructions to replace the stored image data of the map node associated with the current position with the collected image data.

13. The system of claim 10, wherein the electronic map update task further comprises the one or more map update instructions to, determine the electronic map does not include the map node associated with the current position, add a new map node to the electronic map for the current position and store at the new map node the collected image data.

14. The system of claim 13, wherein the electronic map update task further comprises the one or more map update instructions to:
   determine the electronic map includes one or more excessive neighboring map nodes relative to the new map node, the one or more excessive neighboring map nodes being a map node associated with a position that is less than an excessive neighbor distance from the current position of the new map node, the excessive neighbor distance defining a minimum distance between two map nodes of the electronic map; and
   in response to determining the electronic map includes the one or more excessive neighboring map nodes, remove the one or more excessive neighboring map nodes from the electronic map.

15. The system of claim 10, wherein the electronic map update task further comprises the one or more map update instructions to, for each neighboring map node of the one or more neighboring map nodes, compare the collected image data with the stored image data of that neighboring node of the one or more neighboring map nodes to determine the dissimilarity level; and in response to determining the dissimilarity level exceeds a node removal threshold, remove that neighboring map node of the one or more neighboring map nodes from the electronic map.

16. The system of claim 10, wherein the neighbor threshold comprises a maximum distance between a position of two map nodes.

17. The system of claim 10, wherein the dissimilarity threshold comprises a minimum mismatch between the collected image data and the stored image data to indicate the electronic map is outdated.

18. The system of claim 10, wherein the electronic map update comprises one or more map update instructions to:
   detect at least one dynamic object within the collected image data and filter the collected image data to remove the at least one dynamic object.

19. The system of claim 10, wherein the dissimilarity level exceeds the dissimilarity threshold if the collected image data indicates the addition or removal of at least one obstacle, and wherein the at least one obstacle is at least one non-dynamic object that obstructs navigation of the self-driving material transport vehicle; and
   wherein the electronic map update task further comprises the one or more map update instructions to update the stored image data based at least on the addition or removal of at least one obstacle indicated by the collected image data at the current position.

\* \* \* \* \*